United States Patent
Zhao et al.

(10) Patent No.: US 8,966,497 B2
(45) Date of Patent: *Feb. 24, 2015

(54) NAME SERVICE OBJECT CLUSTERING

(71) Applicant: Borland Software Corporation, Scotts Valley, CA (US)

(72) Inventors: Cuie Zhao, The Floravale (SG); Vishwanath Keshavamurthy Kasaravalli, Hayward, CA (US); Vijaykumar Natarajan, Mountain View, CA (US)

(73) Assignee: Borland Software Corporation, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/031,382

(22) Filed: Sep. 19, 2013

(65) Prior Publication Data

US 2014/0089512 A1 Mar. 27, 2014

Related U.S. Application Data

(63) Continuation of application No. 10/017,495, filed on Dec. 14, 2001, now Pat. No. 8,566,849.

(60) Provisional application No. 60/255,651, filed on Dec. 14, 2000.

(51) Int. Cl.
*H04L 29/08* (2006.01)
*G06F 9/54* (2006.01)
(Continued)

(52) U.S. Cl.
CPC ............ *H04L 67/1004* (2013.01); *G06F 9/541* (2013.01); *G06F 9/546* (2013.01); *G06F 9/5083* (2013.01); *G06F 11/1482* (2013.01); *G06F 11/2028* (2013.01); *G06F 11/2035* (2013.01)
USPC .......................................... 719/310; 718/105

(58) Field of Classification Search
CPC .......... G06F 9/54; G06F 9/505; G06F 9/5083
See application file for complete search history.

(56) References Cited

U.S. PATENT DOCUMENTS 5,452,447 A 9/1995 Nelson et al.
5,675,795 A 10/1997 Rawson et al.
(Continued)

OTHER PUBLICATIONS

Bruce S. Siegell, Automatic Generation of Parallel Programs with Dynamic Load Balancing of a Network of Workstations, May 5, 1995.*
Ennio Grasso, "Java Reflective Broker", downloaded from makabyte.it/1997/12/jrbspec.html, dated Dec. 1997 (16 pages).
(Continued)

*Primary Examiner* — Lechi Truong
(74) *Attorney, Agent, or Firm* — DLA Piper LLP (US)

(57) ABSTRACT

Methods and systems for load balancing of Common Object Request Broker Architecture (CORBA) object servers. A name service cluster is invoked. It is indicated to a user whether bind interceptors are in use. The user is provided with a class having relevant methods if bind interceptors are in use. The class that contains the most relevant methods is specified. Name service clusters are established for object servers where each name service cluster contains a unique object binding table containing object server reference bindings. Object server reference bindings having identical names are clustered into common clusters. A load balance is performed by having a name service select an object server located in an invoked cluster. A cluster component is appended to the invoked cluster to provide failover upon failover of the object server; and a selected object server reference binding is forwarded to a client upon completion of the load balance.

18 Claims, 5 Drawing Sheets

(51) Int. Cl.
*G06F 9/50* (2006.01)
*G06F 11/14* (2006.01)
*G06F 11/20* (2006.01)

(56) References Cited

U.S. PATENT DOCUMENTS

| | | | |
|---|---|---|---|
| 5,742,759 | A | 4/1998 | Nessett et al. |
| 6,209,018 | B1 * | 3/2001 | Ben-Shachar et al. ........ 718/105 |
| 6,606,643 | B1 | 8/2003 | Emens et al. |
| 7,043,731 | B2 | 5/2006 | Ramaswamy |

OTHER PUBLICATIONS

Arno Schmidmeier, "WG: [omniORB] Loading Balancing Example", downloaded from omniorb-support.com/pipermail/omniorb-list/1999-August/013435.html, dated Aug. 19, 1999 (3 pages).

Geoffrey Fox et al., "The Gateway System: Uniform Web Based Access to Remote Resources", JAVA'99, (7 pages) (1999).

Fredik Janson et al., "Master Thesis in Computer Science: CORBA VS. DCOM", The Royal Institute of Technology Kungliga Tekniska Hodskolan, Dec. 21, 2000 (123 pages).

* cited by examiner

NAME SERVICE OBJECT CLUSTERING

CROSS REFERENCE TO RELATED APPLICATIONS

This application is a continuation of U.S. patent application Ser. No. 10/017,495, filed Dec. 14, 2001 (now U.S. Pat No. 8,566,849, issued Oct. 22, 2013), which claims priority of U.S. Provisional Patent Application No. 60/255,651, filed Dec. 14, 2000. All of the foregoing are incorporated herein by reference in their entireties.

BACKGROUND OF THE INVENTION

1. Field of the Invention

The present invention generally relates to the field of distributed object oriented computing and, more particularly, to a method for fault tolerance, load balance and "failover" of CORBA object servers via name service clustering.

2. Description of the Related Art

Recently, Common Object Request Broker Architecture (CORBA) has emerged as the de facto standard architecture for distributed object computing. This distributed object infrastructure enables organizations to build and deploy robust distributed object applications across the Internet and enterprise intranets.

Emerging application servers and Enterprise Java Bean (EJB) technology are being built on top of the pre-existing CORBA infrastructure. Remote Method Invocation (RMI) technology takes advantage of the capabilities of the Common Object Request Broker Architecture/Internet Inter Orb Protocol (CORBA/IIOP) infrastructure. As a result, fault tolerance, high availability and the load balancing capability of CORBA object servers become critically important due to the increased system capacity.

For example, a large number of requests to a CORBA object server can cause information bottlenecks at the server (i.e., a decrease in server capacity or a reduction in processing speed). As a result, a single CORBA object server can become the single-point of failure in a network. Moreover, since clients maybe long lived, unavailability of services from a server is unacceptable.

In the past, these problems have been solved by replicating the CORBA servers and performing a load balance by using a predefined algorithm among the replicas to select a specific object server. Load balancing across the servers can be performed with a variety of techniques, such as via a Round Robin directory and a naming service or a special CORBA object server which dispatches requests from clients to servers. However, substantial coding, redesign and reconfiguration of the server, which results in increased costs is unavoidable.

Another solution to the prior problems involves redesigning and replicating the CORBA server, and statically configuring the replica servers such that each server object contains one profile for each replica server object. Upon failure of a server, client requests "failover" to a replica server. However, this configuration is not scalable, i.e., it is not applicable to different servers located in a large network. Once the redesign, replication, and configuration of the server is completed and implemented, it cannot be changed.

A further solution to the above mentioned problems comprises redesigning the client such that it captures failures and redirects requests to another server. However, this approach not only requires client code changes, but also requires that the client possess prior knowledge related to the existence of all the servers in the network. It is therefore apparent there is a need for a method for reducing failures associated with selecting a server located in a distributed object oriented computing environment.

SUMMARY OF THE INVENTION

The present invention is directed to a method for fault tolerance, load balance and "failover" of CORBA object servers via name service clustering. Name service clustering, such as implemented in "Visibroker Naming Service" (Trademark, Borland Software Corp, Scotts Valley, Calif.), permits naming service load balancing over a set of object references contained within the same cluster such that loads are equitably distributed among servers. Each cluster contains its own unique object binding table which contains object references that each typically represent a single server. Load balancing is performed using a load balance algorithm (e.g., Round Robin). The specific algorithm which is used to perform load balancing is specified upon creation of each naming service cluster.

When a client machine invokes a cluster located under a particular context or specific directory, i.e., "resolves," a load balance is performed to return an object reference which was previously bound to the cluster. The client machine may then communicate with the server associated with the object reference which was selected. Failover is provided by dynamically adding cluster components to resolved object references upon resolving each cluster.

In accordance with the invention, a method for fault tolerance, load balance and failover of CORBA object servers comprises the steps of invoking a cluster contained in a context; performing a load balance to select an object server located in the invoked cluster; appending a cluster component to the invoked cluster to provide failover upon failure of the object server; forwarding a selected object reference to a client upon completion of the load balance; and communicating with a server associated with the selected object reference which was forwarded to the client.

In another embodiment of the invention a method for fault tolerance, load balance and failover of CORBA object servers comprises the steps of: setting a flag in a file to activate implicit clustering; invoking a cluster contained in a context having clusters; performing a load balance to select an object server located in the clusters; forwarding a selected object reference to a client upon completion of the load balance; and communicating with the server associated with the selected object reference which was forwarded to the client.

BRIEF DESCRIPTION OF THE DRAWINGS

The present invention may be more readily understood by one skilled in the art with reference being had to the following detailed description of the preferred embodiments thereof, taken in conjunction with the accompanying drawings wherein like elements are designated by identical reference numerals throughout the several views, and in which.

DESCRIPTION OF PREFERRED EMBODIMENTS

By way of overview and introduction, the invention is described in connection with a preferred embodiment, depicted in FIG. 3, in which load balancing is performed among servers 110 connected to the Internet 120, or other distributed computer network.

Generally, the Visibroker Naming Service™ permits the activation and deactivation of an implicit clustering feature and associates multiple object references with a single name. Activation of the implicit clustering feature may be accomplished using a flag located in a file, such as a configuration file, or the like. The clustering of object references in this manner becomes highly scalable because the object references may be dynamically added or removed from a cluster through cluster bind or unbind operations.

When implicit clustering is activated, object reference bindings using the same name are clustered together in the same cluster. A default load balance algorithm, such as Smart Round Robin, is used for implicit clustering. This algorithm may be changed at the discretion of the user.

If a call to a name within the clustered object references is invoked, the naming service load balances over the set of object references associated with the name and distributes the load accordingly. As a result, the need to recreate clusters is eliminated because the load balancing is performed among a common predetermined group of object reference binders.

Figure 1:
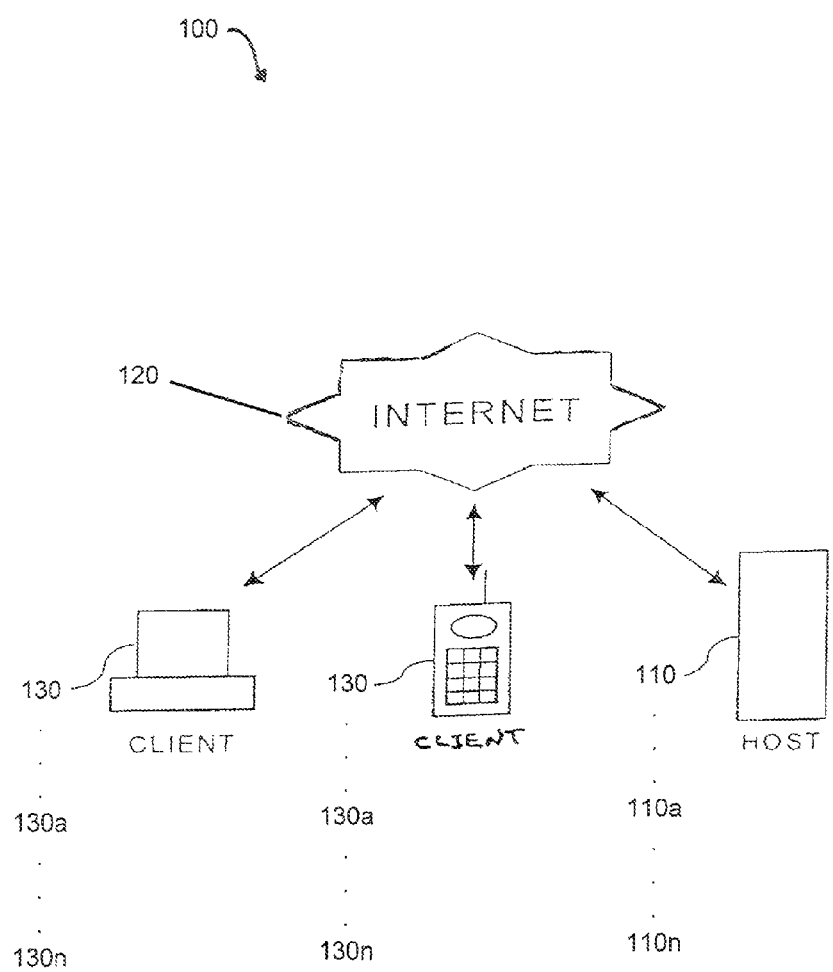
FIG. 1 is an illustration of a network arrangement of hardware components for implementing a method in accordance with a preferred embodiment of the invention.

FIG. 1 shows a network arrangement by which the preferred embodiment can be implemented. The network 100 includes host servers 110, 110a . . . 110n which provide content over the Internet 120 to a plurality of distributed users that access the host server through client machines 130, 130a . . . 130n. The content provided by the host server 110, 110a . . . 110n can be viewed by users through a web browser or other functionally equivalent software running at their respective client machines 130 (hereinafter, "browser").

The client machines or "client" 130 can assume a variety of forms, including a home computer, a personal digital assistant (PDA), a pager, an Internet compliant telephone, or other Internet compliant device. The client machines 130 and the host server 110 communicate with one another in a conventional manner over a communication link through a distributed computer network such as the Internet 120. In lieu of the Internet, communications can be through an Intranet or Extranet or between a host computer and a kiosk located nearby, as understood by those of skill in the art.

Figure 2:
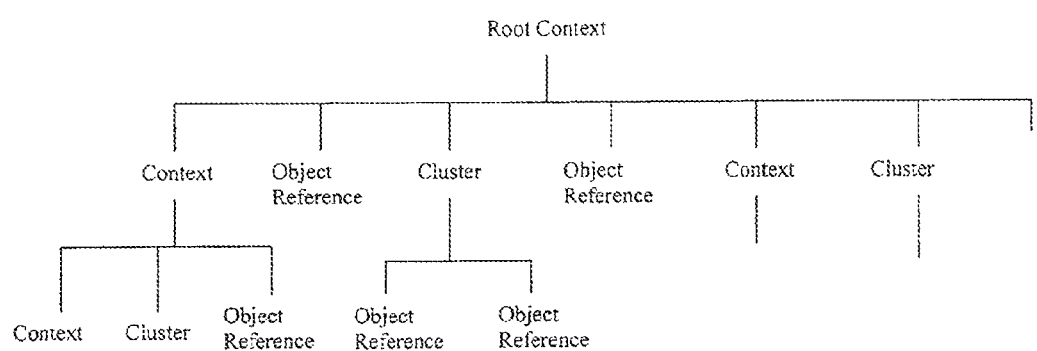
FIG. 2 is an exemplary illustration of a naming graph comprising an object management group in a distributed computing system.

FIG. 2 is an exemplary illustration of a naming graph comprising an object management group in a distributed computing system. The starting point for the construction of such a graph is the "Root Context" of the object management group. The Root context contains object name bindings. Such a repository of object name bindings is called a CosNaming Service, and permits a client to locate an object using a logical name which is bound within the repository.

Visibroker Naming Service™ is an implementation of OMG CosNaming Service. In addition, Visibroker Naming Service™ includes a feature called clustering which groups objects within a cluster to provide scalability and high availability to applications via load balancing and alternative server selection, "failover", upon server failures.

A Visibroker Naming Service™ cluster is a placeholder for a set of functionally exchangeable objects. A naming service cluster differs from the CosNaming context in that the CosNaming context is a directory that may contain sub-contexts object references, and service clusters, while a service cluster may contain only object references. Each object reference shown in FIG. 2 will contain the server's Host Name, IP Address, Port No., and the like.

Figure 3:
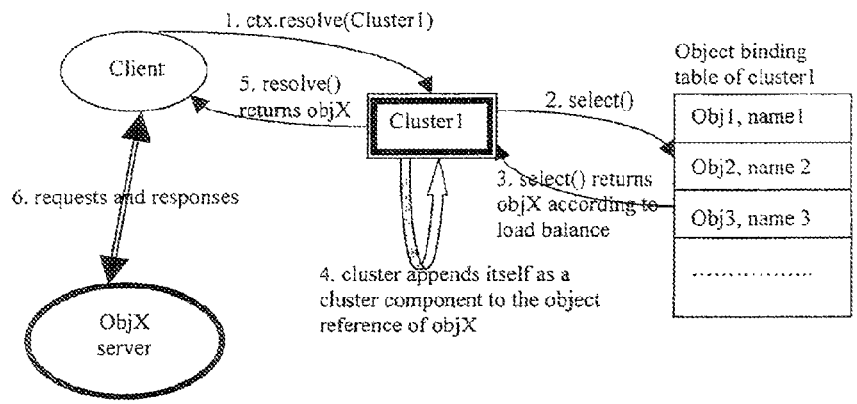
FIG. 3 is an illustration of a server replication operation in accordance with the preferred embodiment of the invention.

FIG. 3 is an illustration of a server replication operation in accordance with the preferred embodiment of the invention. Visibroker Naming Service™ clustering permits naming service load balancing over a set of object references contained within the same cluster such that loads are equitably distributed among servers. Each cluster contains its own unique object binding table which contains object references which each typically represent a single server. Load balancing is performed using a load balance algorithm (e.g., Round Robin). The specific algorithm which is used to perform load balancing in a given implementation is not critical to the invention, but is specified upon creation of each naming service cluster.

When a client invokes a cluster located under a particular context or specific directory (1), i.e., "resolves," a load balance (2) is performed to return an object reference (3) which was previously bound to the cluster. The client may then communicate with the server associated with the object reference which was selected.

As shown in FIG. 3, failover is provided by dynamically adding cluster components to resolved object references upon resolving each cluster (4). In other words, upon resolving each cluster, a cluster component which is a part of an object reference of an object is created. Each cluster component provides to a client object resource broker (ORB) information which permits the client ORB to access the cluster object located in the name service to which this object is bound. Upon the occurrence of a failure, this information permits the client ORB to contact the cluster object to obtain another object in the same cluster to which the client ORB can then failover to. If an object reference fails during processing, the particular object reference binding associated with the specific object reference in the cluster becomes stale.

When a client invokes an invocation to a specific server, the connection to the server is accomplished using a process called binding. In order for the client to communicate with the server, it must bind with the server using the IP Address and Port No. contained in a specific object reference. Here, a binding is performed by using an object reference and performing the necessary steps to derive a concrete connection to a specific process that implements the functionality represented by that object reference. User participation in the binding process is accomplished via a "binding interceptor" which is a Java class that the user may implement as desired. Each class comprises methods of differing relevancies which are used to indicate the binding status (i.e., Bind, Bind_Succeeded, Bind_Failed, and Exception_Occurred). A "Bind" is performed by using an object reference and performing the steps necessary to derive a concrete connection to a specific process which implements the functionality represented by that object reference. Here, a Bind_Succeeded is an indication that a connection was achieved, a Bind_Failed is an indication that a connection was not established and an Exception_Occurred represents an indeterminate state between Bind_Succeeded and Bind_Failed.

Each time a client attempts to establish a connection with a server object, a bind method is called. In accordance with the invention, if a user is provided with the knowledge that bind interceptors may be used, the user will be provided with a class containing the most relevant methods, preferably the three most relevant methods. In the preferred embodiment, the most relevant methods are Bind, Bind_Succeeded and Bind_Failed. The user then writes (specifies) the class such that the class subsequently contains the most relevant methods. When the connection to the server is being established, the user code is called (i.e., a bind interceptor is used). The bind interceptor provides a user with an option to select an alternative server in the instance where the system was operating adequately and then fails. For example, if a returned bind interceptor contains a Bind_Failed method, the user is presented with an opportunity to choose to connect to another server.

When an attempt to send a request to the stale server is made, the client associated with the stale object reference will transparently intercept the cluster component using the binding interceptor. The interceptor will then invoke the cluster's select operation (i.e., its load balancing algorithm) to select and return to the client another object reference in the same cluster. Communication is then established between the client and the server of the newly returned object reference. As a result, the failover to one of the object references in the same cluster is transparently achieved. The failed object reference is thereafter marked as "suspect." In an embodiment, the stale object reference is automatically removed from the cluster based on a user established preference.

In an aspect of the invention, the Visibroker Naming Service™ permits the activation and deactivation of an implicit clustering feature and associates multiple object references with a single name. Activation of the implicit clustering feature may be accomplished using a flag located in a file, such as a configuration file, or the like. The clustering of object references in this manner becomes highly scalable because the object references may be dynamically added or removed from a cluster through cluster bind or unbind operations.

Figure 4:
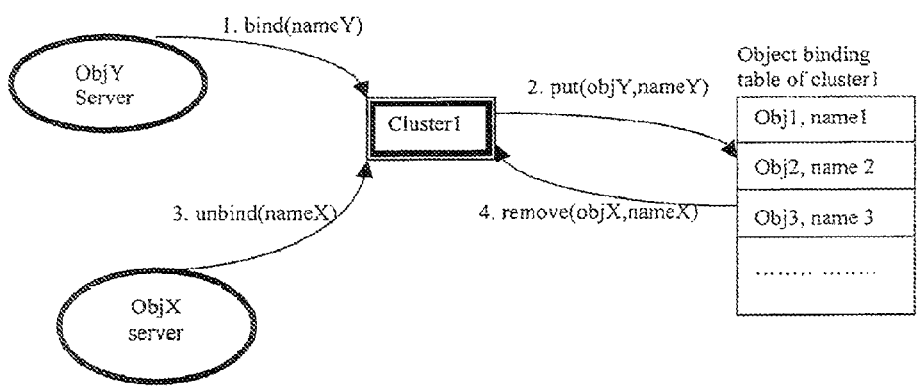
FIG. 4 is an illustration of a dynamic bind and unbind operation of cluster objects in accordance with the preferred embodiment of the invention.

FIG. 4 is an illustration of a dynamic bind and unbind operation of cluster objects in accordance with the preferred embodiment of the invention. When implicit clustering is activated, object reference bindings using the same name are clustered together in the same cluster. A default load balance algorithm, such as Smart Round Robin, is used for implicit clustering. This algorithm may be changed at the discretion of the user.

When a call to a name within the clustered object references is invoked (1), the naming service load balances (2) over the set of object references associated with the name and distributes the load accordingly (4). As a result, the need to recreate clusters is eliminated because the load balancing is performed among a common group of object reference binders.

Figure 5:
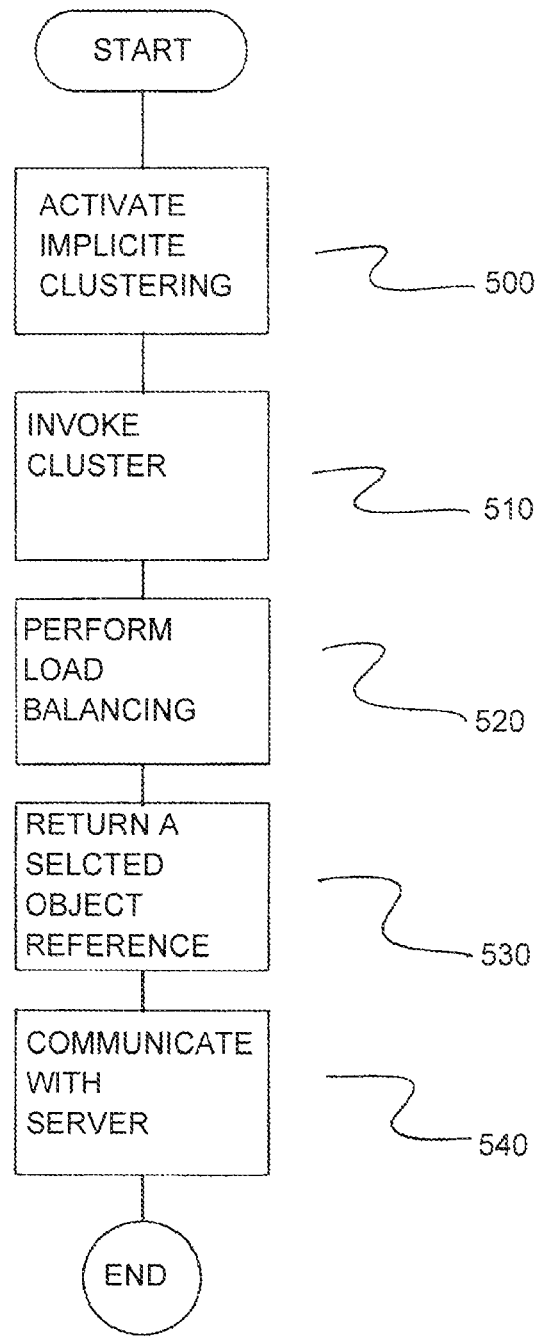
FIG. 5 is a flow chart of a method for load balancing in accordance with the preferred embodiment of the invention.

FIG. 5 is a flow chart of a method for load balancing in accordance with the preferred embodiment of the invention. In accordance with the preferred embodiment, the method is implemented when a client invokes a cluster located under a particular context or specific directory, as indicated in step 500. A load balance is performed to return an object reference which is bound to the cluster, as indicated in step 510. Load balancing is performed using a load balance algorithm (e.g., Round Robin). The specific algorithm which is used to perform load balancing is specified upon creation of each naming service cluster. An object reference is forwarded to the cluster, as indicated in step 520. Next, cluster components are dynamically added to resolved object references subsequent to load balancing each cluster to provide failover, as indicated in step 530. Failover is provided in the mariner discussed previously. Next, the client communicates with the server associated with the object reference which was selected and forwarded to the client, as indicated in step 540.

Figure 6:
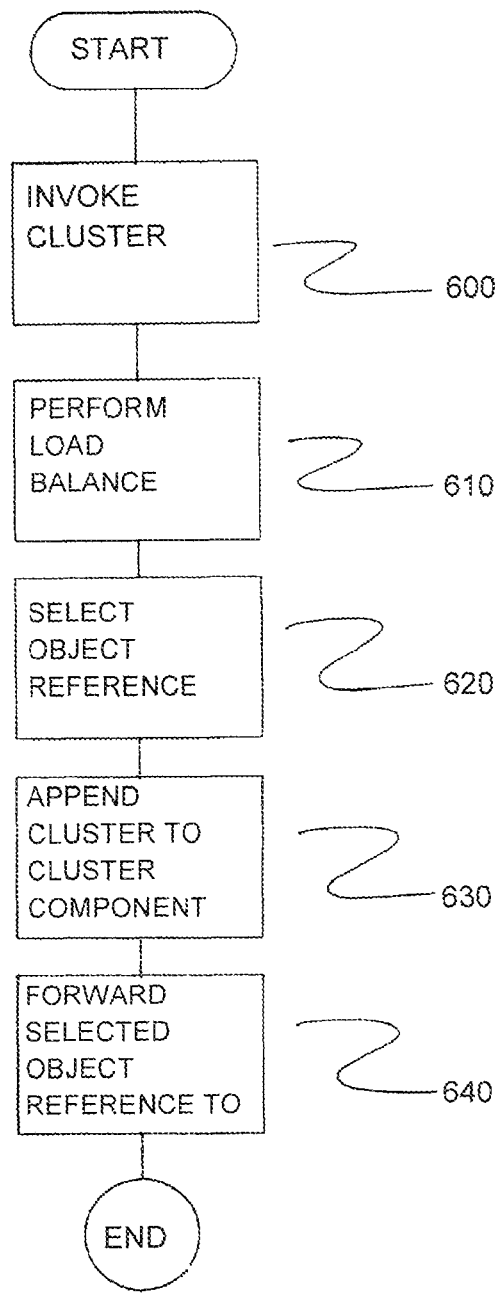
FIG. 6 is a flow chart of a method for dynamic object clustering in accordance with the preferred embodiment of the invention.

FIG. 6 is a flow chart illustrating dynamic bind and unbind operations of cluster objects in accordance with the preferred embodiment of the invention. In accordance with this embodiment, the method is implemented when implicit clustering is activated, as indicated in step 600. Next, a cluster containing the clustered object reference bindings using the same name is invoked, as indicated in step 610. Load balancing is performed on the clustered object references using a default load balance algorithm, as indicated in step 620. This algorithm may be changed at the discretion of the user, e.g., from a Round Robin algorithm to a different algorithm. A selected object reference based on the load balance is returned upon completion of load balancing, as indicated in step 630. Next, the client communicates with the server associated with the object reference which was selected and forward to the client, as indicated in step 640.

Methods in accordance with the invention permit transparent load balancing among multiple object references in the same cluster to be achieved. In addition, transparent failover among object references in the same cluster is provided. Method according to the invention also provide a dynamic addition of new object references into a cluster via binding, along with the dynamic removal of old object references from a cluster via unbinding. Moreover, automatic detection of stale object references in a cluster and clean up based on the preference of a client is achieved. Further, such methods provide a consistent application of the load balancing algorithms per cluster. New load balancing algorithms may be up-loaded to the system as required. The method eliminates the need to change the client code or server code such that manual configurations are not required.

While the invention has been particularly shown and described with reference to a preferred embodiment thereof, it will be understood by those skilled in the art that various changes in form and details may be made therein without departing from the spirit and scope of the invention.

What is claimed is:

1. A method for load balance of Common Object Request Broker Architecture (COBRA) object servers, comprising:
   invoking a name service cluster;
   indicating to a user whether bind interceptors are in use;
   providing the user with a class having relevant methods if bind interceptors are in use;
   specifying the class such that the class contains the most relevant methods, the most relevant methods comprising: Bind, Bind_Succeeded, or Bind_Failed, or any combination thereof;
   establishing name service clusters for object servers each name service cluster containing a unique object binding table containing object server reference bindings;
   clustering together object server reference bindings having identical names into common clusters such that loads are equitably distributed among object servers;
   performing a load balance by having a name service select an object server located in an invoked cluster;
   appending a cluster component to the invoked cluster to provide failover upon failure of the object server; and
   forwarding a selected object server reference binding to a client upon completion of the load balance.

2. The method of claim 1, wherein the invoking comprises binding to an object server using an IP Address and a port number contained in an object server reference binding.

3. The method of claim 1, further comprising:
checking the bind interceptors if the object server fails; and
selecting an alternative server if a bind interceptor contains a predetermined method; said selecting being performed by the user upon entry of the predetermined method by the user.

4. The method of claim 3, further comprising:
intercepting a cluster component of the object server which failed based on the bind interceptor;
invoking a load balance algorithm of the cluster via the bind interceptor to select and return a new object reference located in the cluster to the client; and
establishing communications with the client and a server of the new object reference; and marking the failed object server to indicated failure thereof.

5. The method of claim 4, further comprising:
removing the marked failed object server from the cluster.

6. The method of claim 3, wherein the predetermined method is Bind_Failed.

7. The method of claim 3, wherein the predetermined method is a Round robin load balancing algorithm.

8. The method of claim 1, further comprising:
specifying a load balance algorithm upon creation of a naming service cluster to perform name service load balancing of object references contained within the clusters, wherein said load balancing is performed based on a predetermined method.

9. The method of claim 1, wherein each cluster contains an object binding table which contains object server reference bindings; and wherein each object server reference binding represents a single object server.

10. A system for load balance of Common Object Request Broker Architecture (CORBA) object servers, comprising:
a processor configured for:
invoking a name service cluster;
indicating to a user whether bind interceptors are in use;
providing the user with a class having relevant methods if bind interceptors are in use; and
specifying the class such that the class contains the most relevant methods, the most relevant methods comprising: Bind, Bind_Succeeded, or Bind_Failed, or any combination thereof;
establishing name service clusters for object servers, each name service cluster containing a unique object binding table containing object server reference bindings;
clustering together object server reference bindings having identical names into common clusters such that loads are equitably distributed among object servers;
performing a load balance by having a name service select an object server located in an invoked cluster;
appending a cluster component to the invoked cluster to provide failover upon failure of the object server; and
forwarding a selected object server reference binding to a client upon completion of the load balance.

11. The system of claim 10, wherein the invoking comprises binding to an object server using an IP Address and a port number contained in an object server reference binding.

12. The system of claim 10, the processor further configured for:
checking the bind interceptors if the object server fails; and
selecting an alternative server if a bind interceptor contains a predetermined method; said
selecting being performed by the user upon entry of the predetermined method by the user.

13. The system of claim 12, the processor further configured for:
intercepting a cluster component of the object server which failed based on the bind interceptor;
invoking a load balance algorithm of the cluster via the bind interceptor to select and return a new object reference located in the cluster to the client; and
establishing communications with the client and a server of the new object reference; and marking the failed object server to indicated failure thereof.

14. The system of claim 13, the processor further configured for:
removing the marked failed object server from the cluster.

15. The system of claim 12, wherein the predetermined method is Bind_Failed.

16. The system of claim 12, wherein the predetermined method is a Round robin load balancing algorithm.

17. The system of claim 10, the processor further configured for:
specifying a load balance algorithm upon creation of a naming service cluster to perform name service load balancing of object references contained within the clusters, wherein said load balancing is performed based on a predetermined method.

18. The system of claim 10, wherein each cluster contains an object binding table which contains object server reference bindings; and wherein each object server reference binding represents a single object server.

* * * * *